United States Patent
Chase, Jr. et al.

[15] 3,690,167
[45] Sept. 12, 1972

[54] METHOD FOR DETERMINING THE RESERVOIR PROPERTIES OF A FORMATION

[72] Inventors: Curtis A. Chase, Jr., Pearland, Tex. 77581; Michael Prats, Houston, Tex. 77025

[73] Assignee: Shell Oil Company, New York, N.Y.

[22] Filed: Jan. 14, 1970

[21] Appl. No.: 2,766

[52] U.S. Cl. ................................73/155, 23/230 EP
[51] Int. Cl. .............................................E21b 49/00
[58] Field of Search.............73/155, 151; 23/230 FP; 166/250, 274

[56] References Cited

UNITED STATES PATENTS 3,343,408  9/1967  Mayer, Jr..................73/155 X

Primary Examiner—Jerry W. Myracle
Attorney—Louis J. Bovasso and J. H. McCarthy

[57] ABSTRACT

A method for testing a well bore hold extending into a subterranean hydrocarbon-bearing earth formation to obtain a quantitative determination of the reservoir properties of the formation by injecting a fluid containing a radioactive isotope tracer down the well borehole and into the formation at a substantially constant rate. The fluid injection is followed by an injection into the formation of the fluid without such a tracer also at a substantially constant rate. Formation fluids are then backflowed from the formation and out the well borehole at a substantially constant rate and the tracer concentration with time in the backflow formation fluids is measured at a plurality of substantially equally spaced intervals.

4 Claims, 4 Drawing Figures

INVENTORS:
CURTIS A. CHASE, JR.
MICHAEL PRATS
BY: *Louis J. Bovasso*
THEIR ATTORNEY

METHOD FOR DETERMINING THE RESERVOIR PROPERTIES OF A FORMATION

BACKGROUND OF THE INVENTION

1. Field of the Invention

The invention relates to the testing of wells; and, more particularly, to a method of testing a well borehole extending into a hydrocarbon-bearing subterranean earth formation to determine reservoir properties of the formation.

2. Description of the Prior Art

In order to determine a development and production program which will result in the maximum economic recovery of reservoir fluids, it is essential to know the areal and vertical distribution of fluid transmissibility and storage in such reservoirs. The spacing of well boreholes, rates of production, stimulation procedures, and pressure maintenance programs, for both primary and secondary recovery, are based to a large extent upon a determination or estimation of such reservoir heterogeneities.

Prior art methods exist for determining reservoir properties of subterranean earth formations. However, such methods are time consuming and generally not accurate especially where samples are to be removed to a laboratory where the properties thereof may have changed during transit thereto from the field. Also, such samples are not always representative of the reservoir as a whole.

SUMMARY OF THE INVENTION

It is an object of this invention to provide an improved method for determining the residual hydrocarbon saturation in situ of a hydrocarbon-bearing subterranean earth formation.

It is a further object of this invention to provide an improved method for determining the effective diffusion of formation fluids within subterranean earth formations for evaluating secondary recovery projects.

These and other objects are preferably accomplished by injecting a fluid containing a tracer down a well borehole extending into a subterranean hydrocarbon-bearing earth formation and into the formation at a substantially constant rate. The fluid injection is followed by an injection into the formation of the fluid without such a tracer also at a substantially constant rate. Fluid is then backflowed from the formation and into the well borehole at a substantially constant rate and the tracer concentration with time in the backflowed formation fluid is measured at a plurality of substantially equally spaced intervals. Values of the residual oil or gas saturation of the formation may then be determined. Preferably, a plurality of tracer injections are made, as for example, three injections of tracer, each injection being flowed a different injection time into the reservoir before backflowing thus resulting in penetrations to three different distances.

DESCRIPTION OF THE PREFERRED EMBODIMENT

Figure 1:
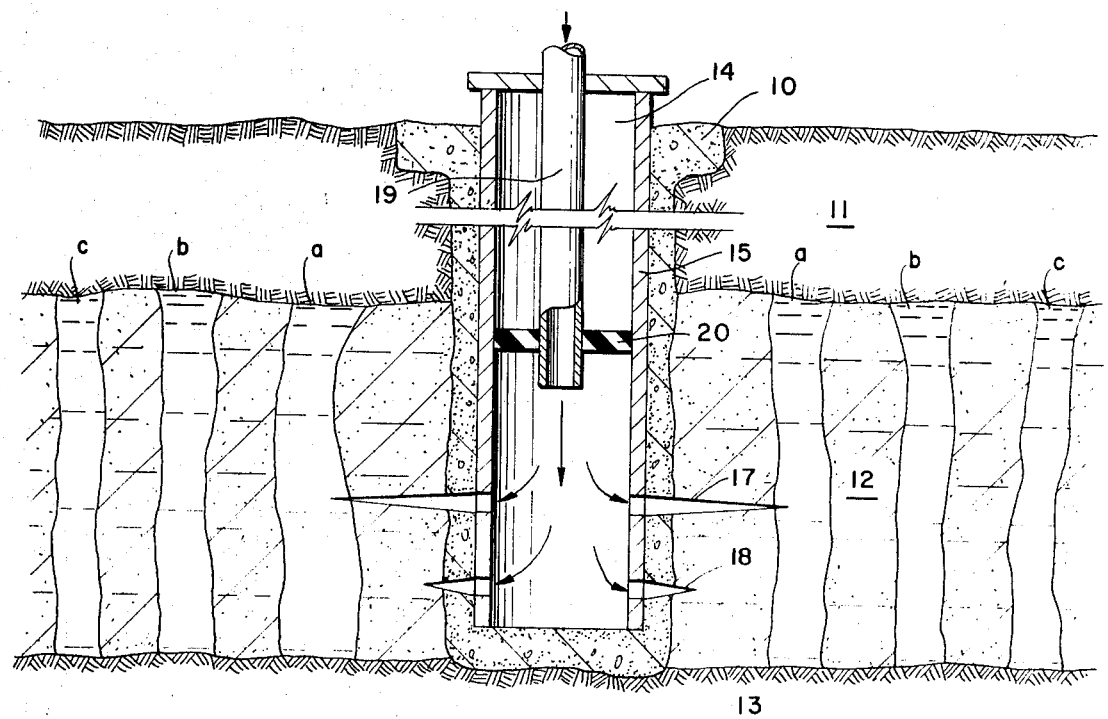
FIG. 1 is a vertical sectional view of a well borehole being treated showing 3 slugs of tracer located at three different distances in accordance with the teachings of our invention.

Referring now to the drawing, FIG. 1 shows an earth formation 11 overlying a subterranean hydrocarbon-bearing formation 12. The hydrocarbon-bearing formation 12 is confined by lower layer 13. A well borehole 14 is sealed off adjacent the portion of formation 12 it is desired to test. For example, well borehole 14 is preferably cased with casing 15 cemented therein at cementing 10 as is well known in the art.

Well borehole 14 is preferably equipped with casing containing perforations, such as 17 and 18 adjacent formation 12. Alternatively the borehole may contain a sand or gravel pack along the face of formation 12.

In a preferred arrangement for ensuring that fluids may be flowed down well borehole 14 and into formation 12, a tubing string 19 is disposed in well borehole 14 and packed off at packer 20.

In operation, a fluid containing a radioactive isotope or otherwise distinctive tracer, such as tritiated water, or substantially any distinctive water soluble material, is injected at a substantially constant rate down tubing string 19, past packer 20 and out perforations 17 and 18 and thus into formation 12 as indicated by the arrows in FIG. 1. This injection is followed by an injection of fluid without the tracer (e.g., plain water) into formation 12, also at a substantial constant rate.

Figure 2:
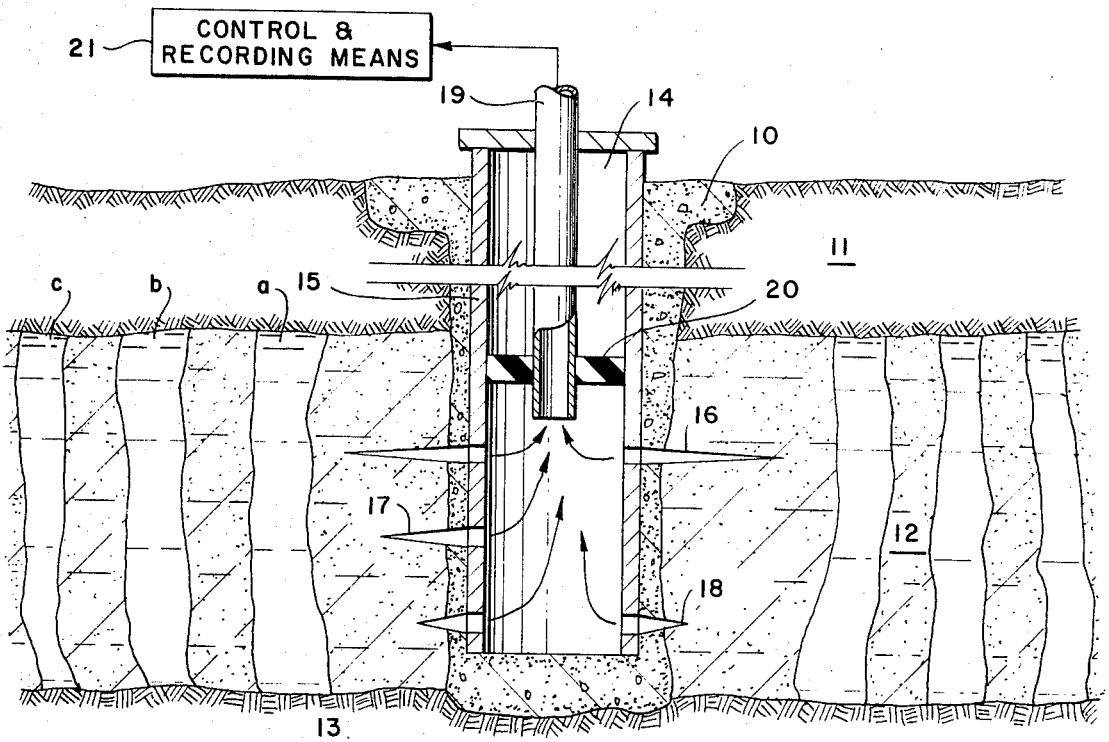
FIG. 2 is a vertical sectional view of the well borehole of FIG. 1 showing a further step in the treatment thereof.

Referring now to FIG. 2, as indicated by the arrows, formation fluids (which contain portions of the fluid containing the tracer) are backflowed from formation 12 and out the well borehole 14 at a substantially constant rate, as for example, by pumping (not shown), as is well known in the art. The recovered fluids are passed through control and recording means 21 where the tracer concentration with time is measured at a plurality of substantially equally spaced intervals. Such control and recording means are well known in the art and further discussion is deemed unnecessary.

EXAMPLE

The following parameter valves, believed representative of a typical reservoir, were used to calculate a hypothetical example using the mathematical model described below:

Carrier fluid injection rate, $i/h = 20$ Barrels/day ft.
Rock porosity, $\phi = 0.36$
Residual oil saturation, $S_{or} = 0.2$
Tracer diffusivities, $D_o$ and $D_m = 1 \times 10^{-5}$ cm$^2$/sec
Dispersion parameter, $\alpha d_p = 0.222$ cm Three identical slugs of tracer were assumed injected into the reservoir. The injection of each slug was followed by injection of tracerless fluid at this rate of 20 Barrels/day ft. The three slugs were allowed to penetrate into the reservoir each a different injection time, as for example, slugs $a$, $b$ and $c$ in FIGS. 1 and 2. These times were assumed to be 280.4, 70.1 and 10.5 hours. The well borehole was then backflowed by pumping at a constant rate of 20 Barrels/day ft. The concentration of tracer was monitored at the well bore and resulted in the tracer response curve shown in FIG. 3.

INTERPRETATION OF TEST RESULTS

The following is an interpretation of the test results obtained by the example set forth hereinabove in accordance with the teachings of our invention. It was found that the tracer concentration curve obtained at the control and recording means 21 is dependent upon the flow conditions and the properties of the reservoir being tested. In this manner, proper interpretation of the so-tested well borehole tracer concentration response during withdrawal, as will be set forth hereinbelow, offers an improved method of evaluating certain reservoir properties in situ.

Properties of the so-tested formation that are primarily of interest are reservoir oil or gas saturation $S_{or}$ and the parameters which characterize the dispersion of fluids within the tested formation (i.e., the diffusion coefficient of the reservoir). Knowledge of such dispersion parameters is necessary in order to correctly evaluate possible secondary recovery projects in which mixing of the displacing and displaced fluids takes place because of dispersion.

SYMBOLS

The following symbols are used hereinbelow:
$S_{or}$ - Residual oil saturation
$K$ - Dispersion coefficient
$D_o$ - Molecular diffusion coefficient of tracer
$D_m$ - Molecular diffusion coefficient of tracer in porous material
$\alpha$ - Inhomogeneity factor used in correlation of dispersion coefficients
$d_p$ - Average particle diameter of porous material
$u$ - Darcy flow velocity vector
$\phi'$ - Mobile fluid fraction
$\beta$ - Dimensionless parameter
$r_D$ - Dimensionless radial coordinate
$C_D$ - Dimensionless tracer concentration
$t_D$ - Dimensionless time
$a_1$ - Dimensionless parameter
$a_2$ - Dimensionless parameter
$r_A$ - Radial coordinate
$t_A$ - Time
$\phi$ - Reservoir rock porosity
$i$ - Injection rate
$h$ - Height
$r_o$ - Arbitrarily chosen scale factor for length
$q_A$ - Bulk volumetric flow rate

MATHEMATICAL MODEL

The theoretical tracer concentration at the well bore is governed by the solution to the convective diffusion equation as will be discussed hereinbelow. A one-dimensional model is assumed in which the flow of carrier fluid is at a constant volumetric rate in the radial direction. The dispersion coefficient is assumed to be a function of the fluid velocity. Following Perkins et al, (Perkins, T.K. and Johnston, O.C. (1963), Review of Diffusion and Dispersion in Porous Media, J. Soc. Petr. Engr., March, p. 70.), the functional form is taken as $$\frac{K}{D_o} = \frac{D_m}{D_o} + \left(\frac{\alpha d_p \mu}{D_o \phi'}\right)^\beta \quad (1)$$

In dimensionless form, the convective diffusion equation becomes:

$$r_D \frac{\partial C_D}{\partial t_D} \pm \frac{\partial C_D}{\partial r_D} - \frac{\partial}{\partial r_D}\left\{[a_1 r_D + a_2 r_D 1 - \beta]\frac{\partial C_D}{\partial r_D}\right\} = 0 \quad (2)$$

where the dimensionless radial coordinate $r_D = r_A/r_o$ (3)

dimensionless time $$t_D = \frac{q_A t_A}{\phi' r_o^2} \quad (4)$$

$$\phi' = (1 - S_{or})\phi \quad (5)$$

$$a_1 = \frac{D_m \phi'}{q_A} \quad (6)$$

$$a_2 = \left(\frac{q_A}{D_o \phi'}\right)\beta - 1 \left(\frac{\alpha d_p}{r_o}\right)\beta \quad (7)$$

$q_A = 1/2\pi \, i/h$ = volumetric injection rate per radian per unit of height (8)
$r_o$ = arbitrarily chosen scale factor for length By matching solutions of Equation (2) with field test data, estimates of the parameters $a_1$, $a_2$, and $\beta$ may be obtained from which $\phi'$ and the dispersion parameter $\alpha d_p$ may be calculated. If a separate estimate of the reservoir rock porosity $\phi$ is known, the residual oil saturation $S_{or}$ may also be calculated.

SOLUTION TO THE MODEL

The mathematical model, described by Equation (2) with injection of tracer specified at the well bore boundary may be solved by numerical techniques which are well known in the art.

DETERMINATION OF THE PARAMETERS FROM FIELD TESTS

The effect of individual parameters on the tracer concentration response at the well bore has been determined.

Figure 3:
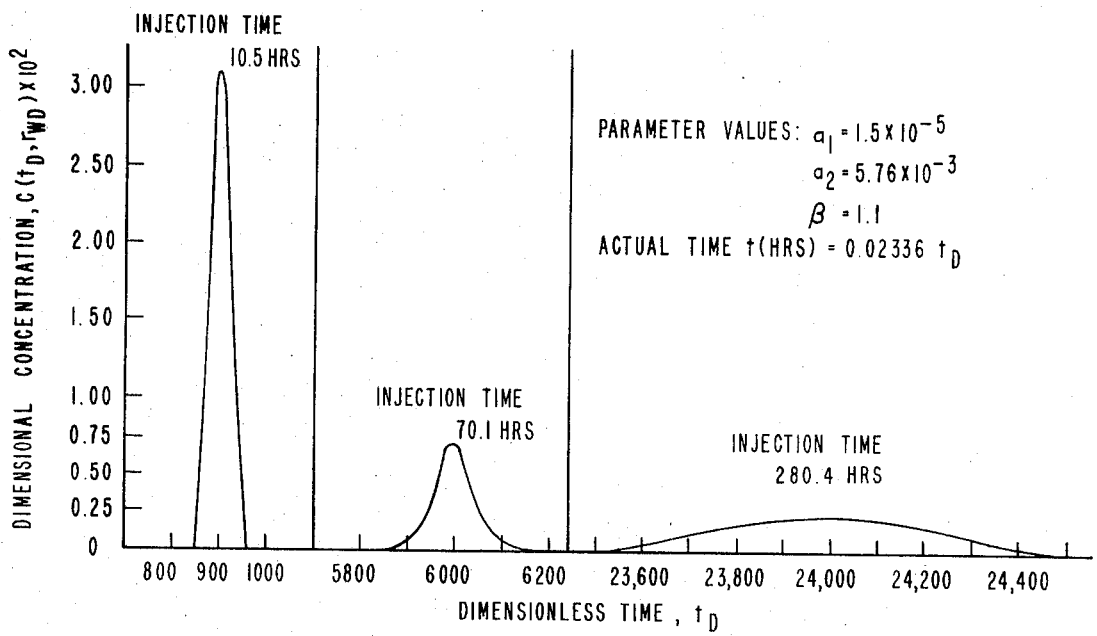
FIGS. 3 and 4 are graphical illustrations of the information derived from the treatment of the well borehole of FIG. 1.
Figure 4:
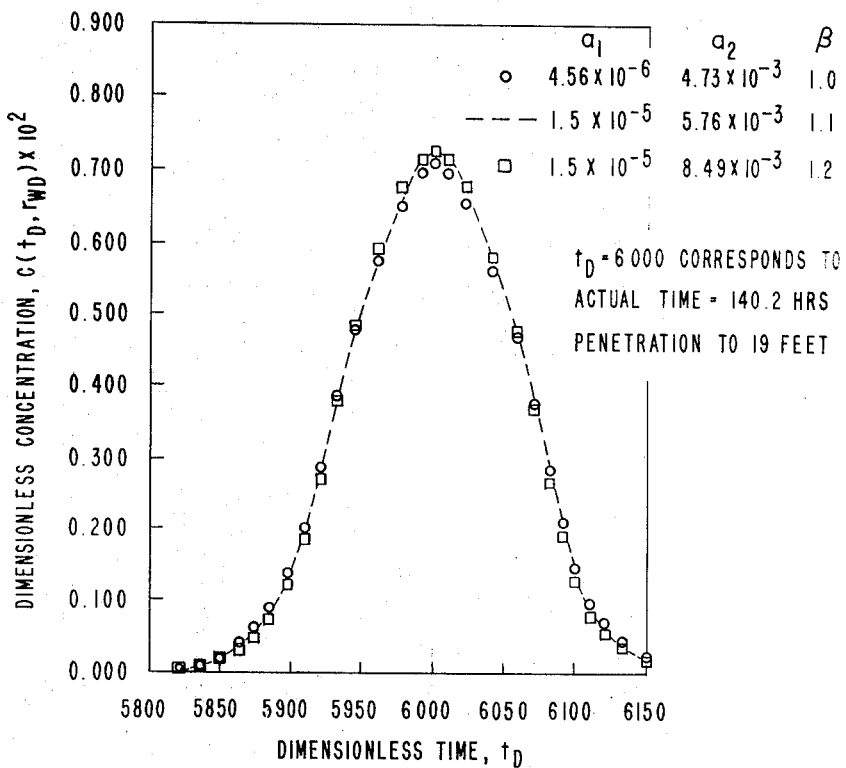

It was observed that a given well bore concentration response is not necessarily the result of a unique set of parameters $a_1$, $a_2$, and $\beta$. This is seen in FIG. 4, which illustrates the dimensionless tracer concentration at the well bore for various sets of parameters, where the three sets of parameter values produce essentially the same response curve. In this figure, a $t_D$ of 6,000 corresponds to an actual time of 140.2 hours with penetration to 5.8 meters. However, by injecting more than one pulse of tracer and allowing each pulse to penetrate a different distance into the reservoir, the unique set of parameters $a_1$, $a_2$, and $\beta$ which characterize the reservoir may be determined. FIG. 3 shows well bore tracer concentration response curves for various injection times, such as pulse injection times of 10.5, 70.1, and 280.4 hours.

In the foregoing, the quantities of $q_A$, $D_o$, $r_o$, are known or controlled experimentally. By matching the theoretical curve with the field test data obtained hereinabove, a set of values for $a_1$, $a_2$, and $\beta$ results. Thus, substituting in Equations 6 and 7, supra, $\phi'$ may be obtained since $D_m$ has been found to be approximately $0.6 \, D_o$ (See Perkins et al., supra). The residual hydrocarbon saturation may then be obtained from Equation 5, supra, rewritten as: $S_{or} = 1 - \phi'/\phi$. (9)

We claim as our invention:
1. A method for testing a well borehole extending into a subterranean hydrocarbon-bearing earth formation to obtain a quantitative determination of the reservoir properties of the formation, said method comprising the steps of:

injecting a fluid containing a tracer down said well borehole and into said formation at a substantially constant rate;

following said injection of fluid containing a tracer with an injection of said fluid without said tracer at a substantially constant rate;

backflowing formation fluids from said formation and out said well borehole at a substantially constant rate; and measuring the tracer concentration with time of said formation fluids being backflowed at a plurality of substantially equally spaced intervals.

2. The method of claim 1 including the step of injecting said fluid containing said tracer into said formation includes the step of injecting said fluid in a plurality of slugs each followed by a slug of fluid without said tracer.

3. The method of claim 2 wherein the step of injecting said fluid containing said tracer in a plurality of slugs includes the step of injecting said fluid containing said tracer in three slugs.

4. The method of claim 1 wherein the step of injecting a fluid containing a tracer includes the step of injecting tritiated water down said well borehole and into said formation.

* * * * *